Patented Nov. 12, 1940

2,221,163

UNITED STATES PATENT OFFICE 2,221,163

RECOVERY OF SILVER FROM SPENT PHOTOGRAPHIC SOLUTIONS

Robert Bowling Barnes, Stamford, and Garnet Philip Ham, Old Greenwich, Conn., assignors to American Cyanamid Company, New York, N. Y., a corporation of Maine No Drawing. Application August 2, 1940, Serial No. 350,164

8 Claims. (Cl. 75—108)

This invention relates to the recovery of silver from spent photographic solutions and particularly from spent photographic fixing solutions.

Exhausted photographic solutions generally contain quantities of silver varying in amounts from traces in the case of exhausted developers to appreciable quantities in the case of fixing solutions where it is present in the form of a silver thiosulfate complex. The desirability of recovering these silver values has long been appreciated and several procedures have been used but until recently only the electrolytic method has proved of any value. However, such a method requires special equipment and is feasible if large quantities of exhausted photographic solutions are to be treated and thus only large concerns such as motion picture film processing establishments would feel that the additional cost was warranted by the value of the silver recovered.

A more recent solution of the problem has been the precipitation and recovery of silver chemically from exhausted solutions such as is described and claimed in the U. S. patent to Ham No. 2,205,792 which employs salts of xanthic acid esters to effect such a separation.

The present invention is concerned with the recovery of silver chemically from spent photographic solutions, particularly fixing solutions, by the addition of a guanidine salt or a quaternary ammonium compound to the solution and recovering the silver from the precipitated complex. In the case of fixing solutions release of the silver causes an increase in the thiosulfate concentration of the solution which renders it effective for further fixing. The potency is not that of a fresh fixing solution but such regenerated solutions can advantageously be used in admixture with fresh fixing solution. Gelatin and other contaminating substances generally found in spent solutions do not adversely affect the silver precipitation which is a material advantage as preliminary filtration is not necessary. However, if the solution after silver recovery is to be reused it may be desirable to remove the gelatin and similar organic colloids prior to the recovery of the silver values, and it is an advantage that the present process is likewise applicable to clarified solutions. A suitable method for removing gelatin is described in the U. S. patent above referred to.

The silver is precipitated as a complex which is readily separated by means of filtration; there is practically no tendency for the silver to remain dispersed in the solution in colloidal form. The complex is then subjected to the ordinary methods of isolating silver in the metallic form such as mixing with a flux and heating at high temperatures in a furnace. In the case of fixers it is noticeable that the precipitate contains a certain amount of bromides and under suitable conditions it is possible to recover the bromide values therefrom.

Although the present invention includes broadly guanidine salts and quaternary ammonium compounds as effective precipitants for the silver values in spent photographic solutions, I have found that the degree of effectiveness varies to a considerable extent and therefore, from the standpoint of economics, the shorter precipitation time or quantity of reagent necessary to be effective, makes the use of certain of these compounds such as guanidine ethyl xanthate and guanidine anthranilate preferable. However, the invention broadly includes the guanidine salts of any acid and it is an advantage that both strong acids such as nitric and hydrochloric as well as weaker acids such as citric and xanthic are useful in forming these salts and that the acid may be either inorganic such as hydrochloric or organic such as anthranilic acid. The quaternary ammonium compounds which added to spent photographic solutions also precipitate silver therefrom may be either as a salt of some acid or as the free tetra-alkyl ammonium hydroxide. The quantity of guanidine salt or quaternary ammonium compound to be added is not critical and amounts as low as 1 gram per liter of solution appear to be effective in precipitating the silver. If larger amounts of reagent are used, they have no harmful effect but are not necessary.

We have found that adjustment of the alkalinity of the solution to a pH value of from about 10 to 11 aids in effecting a more rapid and complete precipitation. The addition of some base such as sodium or potassium hydroxide to the spent photographic solution treated with a guanidine salt or quaternary ammonium compound is therefore desirable when the process of the present invention is employed in recovering silver values.

Many of the compounds of the present invention are effective promotors for precipitating the silver overnight, while with others the deposition takes place slowly and hence to be practically useful their action should be speeded up. We have found that exposure to ultraviolet light over a short period of time materially affects the speed of the reaction so that with the same amount of reagent, deposition of silver takes place in a shorter period of time. This is of special value in small establishments where long standing of the spent solutions would needlessly tie up equipment used in other processes and tend to lessen the benefits of silver recovery. It is therefore possible by the use of ultraviolet light to alter the rate of the reaction so as to adapt the present silver recovery process to the particular economic problems involved in any photographic establishment. When ultraviolet light is used to accelerate the precipitation, the alkalinity of the solution can be adjusted either before or after exposure.

While the present invention is especially useful in the treatment of spent fixing solutions, it is also applicable to other waste solutions from photographic manufacture such as wash water from emulsion manufacture, wash waters from paper manufacture, and wash waters from scrap film burners. The present invention precipitates silver effectively from these solutions, but its advantage here is not as great as in the treatment of spent fixing solutions because other chemical methods can be used in these cases which would be unfit for recovering silver from fixing solutions. In exhausted photographic developing, bleaching, and reducing baths only minute amounts of silver are present so that even though the present process could effectively be applied, the traces of silver would not justify employing this procedure. Generally silver recovery is not warranted unless the solution shows at least 1.75 troy ounces per gallon of solution.

The invention will be described in conjunction with the following typical examples which are included for purposes of illustration and the invention is not intended to be limited thereby.

Example 1

An Eastman F-10 acid hardening and fixing bath was exhausted by processing spectographic photographic process plates. The spent solution was treated with 1 gram of guanidine anthranilate per liter of solution and stirred. After the pH has been increased to 10.0, the solution is allowed to stand for 24 hours and a heavy dark precipitate of a silver complex was recovered by filtration of the solution. The precipitate obtained can be treated for recovery of silver by any of the normal methods, for example by mixing with a flux and heating the mixture to 1500-1900° F. and cupelling if necessary to obtain the silver in metallic form. The slag produced may be treated for recovery of bromides by various leaching processes.

Example 2

A portion of the spent fixing bath described in Example 1 was treated with guanidine ethyl xanthate in the proportion of 1 gram guanidine ethyl xanthate per liter of solution. After the pH has been increased to 10.0, the solution is allowed to stand for 24 hours and a heavy dark precipitate formed on the walls of the container and after filtration the silver was recovered from the precipitated complex as described above.

Example 3

A spent fixing bath was treated with 8 grams of a 10% solution of tetramethyl ammonium hydroxide per liter of solution and exposed to the ultraviolet radiation of a 20 inch quartz mercury arc at a distance of 12 inches for 3 hours, the alkalinity of the solution being adjusted to a pH of about 10. After standing 24 hours a noticeable precipitate formed on the walls of the container, and silver was recovered therefrom in the manner described in Example 1.

Example 4

A spent fixing bath was treated with 1 gram of guanidine nitrate per liter of solution and exposed to the ultraviolet radiation of a 20 inch quartz mercury arc at a distance of 12 inches for 3 hours, the alkalinity of the solution being adjusted to a pH of about 10. After standing 24 hours a slight precipitate formed on the walls of the container, and silver was recovered therefrom in the manner described in Example 1.

Example 5

A spent fixing bath was treated with 1 gram of guanidine thiosulfate per liter of solution and exposed to the ultraviolet radiation of a 20 inch quartz mercury arc at a distance of 12 inches for 3 hours, the alkalinity of the solution being adjusted to a pH of about 10. After standing 24 hours a slight precipitate formed on the walls of the container, and silver was recovered therefrom in the manner described in Example 1.

Example 6

A spent fixing bath was treated with 1 gram of guanidine hydrochloride per liter of solution and exposed to the ultraviolet radiation of a 20 inch quartz mercury arc at a distance of 12 inches for 3 hours, the alkalinity of the solution being adjusted to a pH of about 10. After standing 24 hours a noticeable precipitate formed on the walls of the container, and silver was recovered therefrom in the manner described in Example 1.

Example 7

A spent fixing bath was treated with 1 gram of guanidine citrate per liter of solution and exposed to the ultraviolet radiation of a 20 inch quartz mercury arc at a distance of 12 inches for 3 hours, the alkalinity of the solution being adjusted to a pH of about 10. After standing 24 hours a noticeable precipitate formed on the walls of the container, and silver was recovered therefrom in the manner described in Example 1.

Example 8

A spent fixing bath was treated with 2 grams of guanidine hydrobromide per liter of solution and exposed to the ultraviolet radiation of a 20 inch quartz mercury arc at a distance of 12 inches for 3 hours, the alkalinity of the solution being adjusted to a pH of about 10. After standing 24 hours a noticeable precipitate formed on the walls of the container, and silver was recovered therefrom in the manner described in Example 1.

What we claim is:

1. A method of recovering silver values from spent photographic solutions which comprises subjecting the spent solution to the action of a member of the group consisting of guanidine salts and quaternary ammonium compounds, permitting a precipitate of silver complex to form and removing the precipitate.

2. A method of recovering silver values from spent photographic solutions which comprises adjusting the alkalinity to a pH of approximately 10, subjecting the spent solution to the action of a member of the group consisting of guanidine salts and quaternary ammonium compounds, permitting a precipitate of silver complex to form and removing the precipitate.

3. A method of recovering silver values from spent photographic solutions which comprises adjusting the alkalinity to a pH of approximately 10, subjecting the spent solution to the action of ultraviolet light and a member of the group consisting of guanidine salts and quaternary ammonium compounds, permitting a precipitate of silver complex to form and removing the precipitate.

4. A method of recovering silver values from spent photographic fixing solutions which comprises adjusting the alkalinity to a pH of approximately 10, subjecting the spent solution to the action of a member of the group consisting of guanidine salts and quaternary ammonium compounds, permitting a precipitate of silver complex to form and removing the precipitate.

5. A method of recovering silver values from spent photographic solutions which comprises adjusting the alkalinity to a pH of approximately 10, subjecting the spent solution to the action of guanidine salts, permitting a precipitate of silver complex to form and removing the precipitate.

6. A method of recovering silver values from spent photographic fixing solutions which comprises adjusting the alkalinity to a pH of approximately 10, subjecting the spent solution to the action of guanidine salts, permitting a precipitate of silver complex to form and removing the precipitate.

7. A method of recovering silver values from spent photographic fixing solutions which comprises adjusting the alkalinity to a pH of approximately 10, subjecting the spent solution to the action of guanidine anthranilate, permitting a precipitate of silver complex to form and removing the precipitate.

8. A method of recovering silver values from spent photographic fixing solutions which comprises adjusting the alkalinity to a pH of approximately 10, subjecting the spent solution to the action of guanidine ethyl xanthate, permitting a precipitate of silver complex to form and removing the precipitate.

ROBERT BOWLING BARNES.
GARNET PHILIP HAM.